May 2, 1933. H. CORRALL 1,907,042
THREAD TENSIONING DEVICE FOR SEWING MACHINES
Filed March 31, 1931

Inventor
Herbert Corrall
By
Henry J Miller
Attorney

Patented May 2, 1933

1,907,042

UNITED STATES PATENT OFFICE

HERBERT CORRALL, OF HELENSBURGH, SCOTLAND, ASSIGNOR TO THE SINGER MANUFACTURING COMPANY, OF ELIZABETH, NEW JERSEY, A CORPORATION OF NEW JERSEY

THREAD TENSIONING DEVICE FOR SEWING MACHINES

Application filed March 31, 1931. Serial No. 526,619, and in Great Britain April 9, 1930.

This invention relates to improvements in thread tension devices for sewing machines.

It is found that when stitching with a thread of uneven thickness, for example, with a jute thread, employing a tension device of the usual friction type, the tension may be unduly increased when a length of thread of abnormal thickness passes between the friction discs. In consequence, the stitching is liable to be irregular, while there is also risk of breakage of the thread.

The present invention provides an improved tension device comprising a pair of friction discs spring-urged towards one another to act in similar manner to the usual type of friction tension device in checking the thread when of normal thickness but free to yield relatively to accommodate any additional thickness of the thread and adapted to be entrained by the thread if of abnormal thickness so as to rotate as a unit subject to frictional braking.

A practical construction according to the invention comprises a rotatable thread-engaging disc subject to frictional braking and having at one side a hub upon which is journalled a second thread-engaging disc spring-urged towards the first disc and having freedom on the hub to perform both sidewise and tilting movements.

Figure 1:
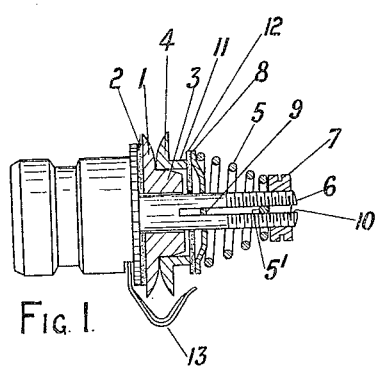
Figure 2:
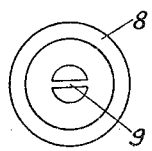

Fig. 1 of the accompanying drawing is a part axial section, part elevation of a tension device embodying the invention; Fig. 2 is a detail view of a non-rotatable washer hereinafter referred to.

The device shown comprises a rotatable disc 1 strung on a slotted pin 6, said disc engaging a friction washer 2 and having at one side a convexly curved or tapered hub 3 of relatively large diameter upon which is journalled a second disc 4 urged towards the disc 1 by a spring 5 and having freedom on the hub 3 to perform both sidewise and tilting movements relatively to the disc 1. It will be seen that the disc 4 is entirely clear of the pin 6 and that its hub 11 extends beyond and is clear of the convexly curved end of the hub 3 of the disc 1. Fitted to the pin 6 is a tension-adjusting nut 7, the spring 5 being interposed between the nut 7 and a metallic non-rotatable washer 8 the aperture of which is traversed by a diametral rib 9 engaging the slot 10 in the pin 6, the end 5¹ of the spring 5 being anchored in the slot 10. Interposed between the washer 8 and the hub 11 of the disc 4 is a friction washer 12.

13 denotes the usual spring-urged thread guide.

What I claim is:—

1. A thread tension device for sewing machines comprising a fixed pin, a thread-engaging disc rotatably mounted on said pin, said disc having a tapered hub of relatively large diameter at one side, a friction member engageable with the other side of said disc, a second thread-engaging disc journalled on said hub and entirely clear of said pin with freedom to perform both sidewise and tilting movements relatively to said first disc, and a spring surrounding said pin and urging said second disc towards said first disc.

2. A thread tension device for sewing machines comprising a fixed pin, a thread-engaging disc rotatably mounted on said pin, said disc having at one side a tapered hub of relatively large diameter, a friction member engageable with the other side of said disc, a second thread-engaging disc journaled on said hub clear of said pin and having a hub extending beyond the end of said first mentioned hub with freedom to perform both sidewise and tilting movements relatively to said first disc, and a spring surrounding said pin and bearing upon the end of the second mentioned hub for urging said second disc toward said first disc.

In testimony whereof I have signed my name to this specification.

HERBERT CORRALL.